US012530854B2

United States Patent
Chen

(10) Patent No.: US 12,530,854 B2
(45) Date of Patent: Jan. 20, 2026

(54) SYSTEM AND METHOD OF OBJECT TRACKING FOR EXTENDED REALITY ENVIRONMENT

(71) Applicant: Fu-Hao Chen, Kaohsiung (TW)

(72) Inventor: Fu-Hao Chen, Kaohsiung (TW)

( * ) Notice: Subject to any disclaimer, the term of this patent is extended or adjusted under 35 U.S.C. 154(b) by 386 days.

(21) Appl. No.: 18/318,742

(22) Filed: May 17, 2023

(65) Prior Publication Data

US 2024/0112421 A1    Apr. 4, 2024

Related U.S. Application Data

(60) Provisional application No. 63/411,632, filed on Sep. 30, 2022.

(51) Int. Cl.
| | | |
|---|---|---|
| G06T 19/00 | (2011.01) | |
| G06F 3/01 | (2006.01) | |
| G06T 7/292 | (2017.01) | |
| G06T 19/20 | (2011.01) | |

(52) U.S. Cl.
CPC ............ *G06T 19/006* (2013.01); *G06F 3/011* (2013.01); *G06T 7/292* (2017.01); *G06T 19/20* (2013.01); *G06T 2219/2004* (2013.01)

(58) Field of Classification Search
CPC ....... G06T 19/006; G06T 7/292; G06T 19/20; G06T 2219/2004; G06F 3/011
See application file for complete search history.

(56) References Cited

U.S. PATENT DOCUMENTS

| | | | | |
|---|---|---|---|---|
| 2015/0049201 | A1* | 2/2015 | Liu | H04L 12/1827 348/189 |
| 2017/0345219 | A1* | 11/2017 | Holz | G06F 3/147 |
| 2017/0357332 | A1* | 12/2017 | Balan | G06F 3/017 |
| 2018/0181196 | A1* | 6/2018 | Lee | G06F 3/012 |
| 2019/0325274 | A1* | 10/2019 | Balan | G06F 3/0346 |
| 2020/0026348 | A1* | 1/2020 | Nienstedt | G06F 3/0383 |
| 2020/0089311 | A1* | 3/2020 | Chou | G06F 3/011 |
| 2021/0183343 | A1* | 6/2021 | Beith | G02B 27/0172 |

* cited by examiner

*Primary Examiner* — Terrell M Robinson
(74) *Attorney, Agent, or Firm* — JCIPRNET

(57) ABSTRACT

A system and a method of object tracking for an extended reality environment are provided. The method includes: providing, by a head-mounted display, an extended reality scene based on a first coordinate system; obtaining, by a first image capture device, a first image comprising a first object and a second object; aligning the first coordinate system with a second coordinate system to obtain a first transformation matrix; determining a first vector between the first object and the second object according to the first image; transforming the first vector to a second vector according to the first transformation matrix; and updating, by the head-mounted display, a virtual object in the extended reality scene according to the second vector, wherein the virtual object corresponds to the first object.

13 Claims, 3 Drawing Sheets

SYSTEM AND METHOD OF OBJECT TRACKING FOR EXTENDED REALITY ENVIRONMENT

CROSS-REFERENCE TO RELATED APPLICATION

This application claims the priority benefit of U.S. provisional application Ser. No. 63/411,632, filed on Sep. 30, 2022. The entirety of the above-mentioned patent application is hereby incorporated by reference herein and made a part of this specification.

BACKGROUND

Technical Field

The present invention is directed to an extended reality (XR) technology, and in particular, to a system and a method of object tracking for XR environment.

Description of Related Art

Currently, the motion of a user of a XR system is captured by one or more wearable devices worn by the user, wherein each of the wearable devices is configured with at least one inertial measurement unit (IMU). The disadvantage of capturing the motion using the wearable device is that the cost of the wearable device is high and wearing the wearable device may make the user uncomfortable. XR system can also utilize optical technology for motion capture. The XR system may capture images of the user by multiple cameras, and analyzes the images for performing motion capture. When the optical technology is used, the user would have to wear an optical sensor or a motion capture suit which may make the user feel uncomfortable. Therefore, a new solution would be required to perform motion capture for the XR system.

SUMMARY

The invention provides a system and a method of object tracking for XR environment, so that the motion of the user may be captured in a convenient manner.

The present invention is directed to a system of object tracking for an extended reality environment, including a head-mounted display, a first image capture device, and a controller. The head-mounted display provides an extended reality scene based on a first coordinate system. The first image capture device obtains a first image including a first object and a second object. The controller communicatively connected to the head-mounted display and the first image capture device, wherein the controller is configured to: align the first coordinate system with a second coordinate system to obtain a first transformation matrix; determine a first vector between the first object and the second object according to the first image; and transform the first vector to a second vector according to the first transformation matrix and transmit the second vector to the head-mounted display, wherein the head-mounted display updates a virtual object in the extended reality scene according to the second vector, wherein the virtual object corresponds to the first object.

In one embodiment of the present invention, the controller is further configured to: align an orientation of the first coordinate system with an orientation of the second coordinate system; and set an origin of the first coordinate system and an origin of the second coordinate system to a common reference point of the first image and the extended reality scene.

In one embodiment of the present invention, the head-mounted display includes a first accelerometer and the first image capture device includes a second accelerometer, wherein the controller is further configured to: set a y-axis of the first coordinate system according to a first gravity direction measured by the first accelerometer; and set a y-axis of the second coordinate system according to a second gravity direction measured by the second accelerometer.

In one embodiment of the present invention, the head-mounted display includes a first magnetometer and the first image capture device includes a second magnetometer, wherein the controller is further configured to: set a z-axis of the first coordinate system according to a first geomagnetic direction measured by the first magnetometer; and set a z-axis of the second coordinate system according to a second geomagnetic direction measured by the second magnetometer.

In one embodiment of the present invention, the controller is further configured to: determine an optical axis of the first image capture device according to the first image; set a z-axis of the first coordinate system according to the optical axis; and set a z-axis of the second coordinate system according to the optical axis.

In one embodiment of the present invention, the controller is further configured to: detect a location of the head-mounted display from the first image; and determine the common reference point according to the location of the head-mounted display.

In one embodiment of the present invention, the controller is further configured to: normalize a scale of the first coordinate system to a scale of the second coordinate system; and transform the first coordinate system from a left-handed coordinate system to a right-handed coordinate system in response to the second coordinate system being the right-handed coordinate system.

In one embodiment of the present invention, wherein the first coordinate system is updated with a movement of the head-mounted display, the controller is further configured to: obtain the first coordinate system corresponding to a first time point from the head-mounted display; and align the first coordinate system corresponding to the first time point with the second coordinate system to obtain the first transformation matrix.

In one embodiment of the present invention, the head-mounted display is further configured to: algin the first coordinate system corresponding to a second time point with the first coordinate system corresponding to the first time point to obtain a second transformation matrix, wherein the second time point is different from the first time point; transform the second vector to a third vector according to the second transformation matrix; and update the virtual object according to the third vector.

In one embodiment of the present invention, the system further including a second image capture device. The second image capture device obtains a second image including the first object and the second object. The controller determines the first vector according to the first image and the second image.

In one embodiment of the present invention, an optical axis of the first image capture device is perpendicular to an optical axis of the second image capture device.

In one embodiment of the present invention, the controller is further configured to: determine the first vector by inputting the first image and the second image to a machine learning model.

In one embodiment of the present invention, the controller is further configured to: obtain a plurality of tracking points of the first object by the machine learning model; and determine an orientation of the first object according to the plurality of tracking points, wherein the head-mounted display updates the virtual object according to the orientation of the first object.

In one embodiment, the controller is further configured to: determine the first vector by inputting the first image to a machine learning model.

In one embodiment of the present invention, the first object includes a body part of a user worn the head-mounted display, and the second object includes the head-mounted display.

In one embodiment, the controller is further configured to: output the second vector.

The present invention is directed to a method of object tracking for an extended reality environment, including: providing, by a head-mounted display, an extended reality scene based on a first coordinate system; obtaining, by a first image capture device, a first image including a first object and a second object; aligning the first coordinate system with a second coordinate system to obtain a first transformation matrix; determining a first vector between the first object and the second object according to the first image; transforming the first vector to a second vector according to the first transformation matrix; and updating, by the head-mounted display, a virtual object in the extended reality scene according to the second vector, wherein the virtual object corresponds to the first object.

Based on the above, the present invention provides a low cost and convenient way to perform motion capture for the user of the XR system.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
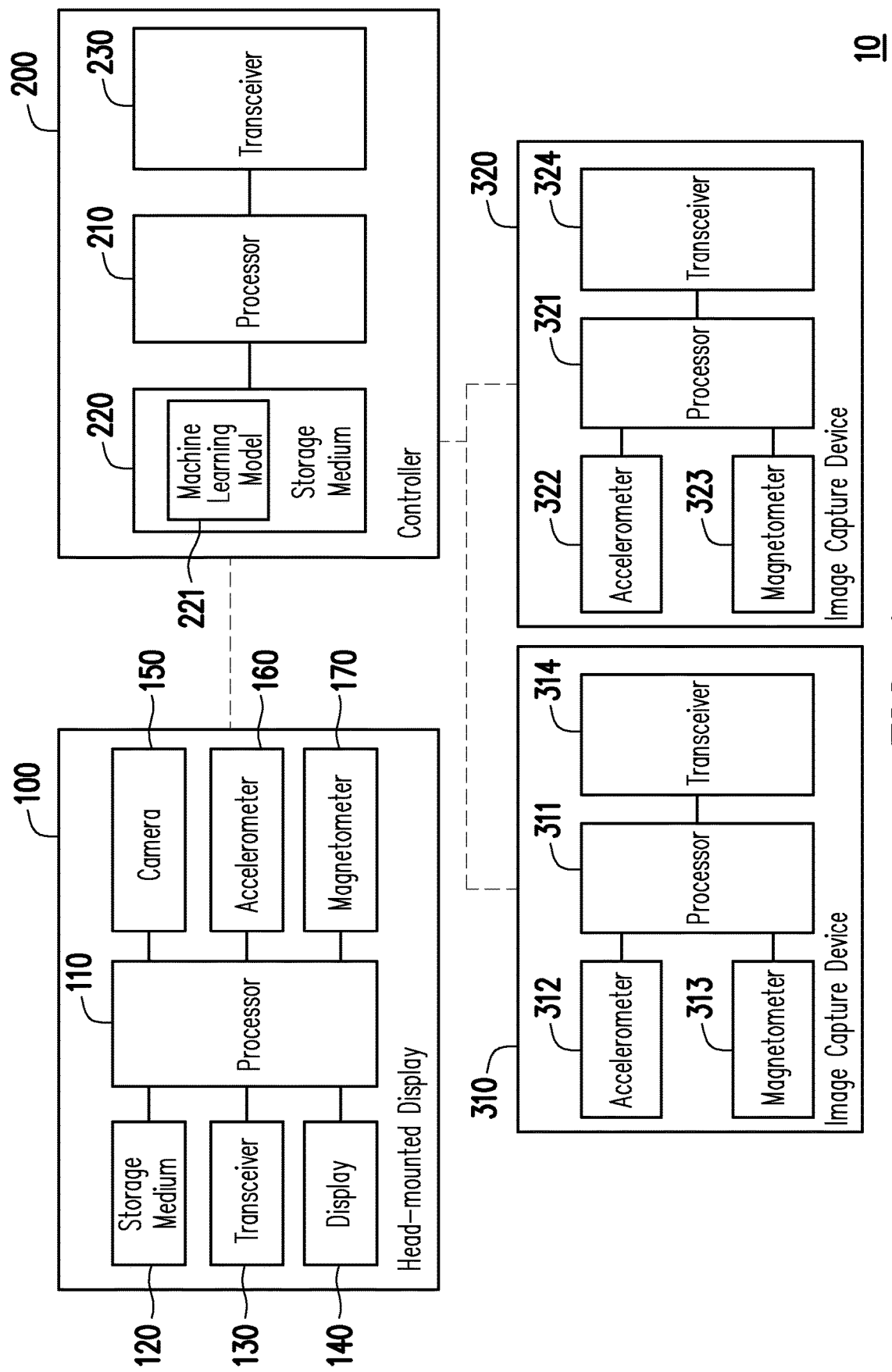
FIG. 1 illustrates a schematic diagram of a system of object tracking for an XR environment according to one embodiment of the present invention.

In order to make the content of the invention easier to understand, the following specific embodiment are given as examples by which the invention can be implemented. In addition, wherever possible, the same reference numbers of components/steps are used in the drawings and embodiments to represent the same or similar components.

FIG. 1 illustrates a schematic diagram of a system 10 of object tracking for an XR environment according to one embodiment of the present invention. The system 10 may include a controller 200, a head-mounted display (HMD) 100, and one or more image capture device such as the image capture device 310 and the image capture device 320. The controller 200 may communicatively connect to the HMD 100, the image capture device 310, or the image capture device 320. In some embodiment, a part of functions of the controller 200 may be implemented by the processor 110 of the HMD 100, the processor 311 of the image capture device 310, or the processor 321 of the image capture device 320. In other words, the controller 200 may be embedded into HMD 100, image capture device 310, or image capture device 320.

The controller 200 may include a processor 210, a storage medium 220, and a transceiver 230. The processor 210 is, for example, a graphics processing unit (GPU), an image signal processor (ISP), an image processing unit (IPU), a central processing unit (CPU), another programmable general purpose or special purpose micro control unit (MCU), a microprocessor, a digital signal processor (DSP), a programmable controller, a special application specific integrated circuit (ASIC), an arithmetic logic unit (ALU), a complex programmable logic device (CPLD), a field programmable gate array (FPGA) or other similar components or a combination of the foregoing components. The processor 210 may be coupled to the storage medium 220 and the transceiver 230, and may access and execute a plurality of modules and various application programs stored in the storage medium 220.

The storage medium 220 is, for example, any type of fixed or removable random-access memory (RAM), a read-only memory (ROM), a flash memory, a hard disk drive (HDD), a solid-state drive (SSD), or similar components or a combination of the foregoing components, and is configured to store the plurality of modules or the various application programs that can be executed by the processor 210. In one embodiment, the storage medium 220 may store a machine learning (ML) model 221.

The transceiver 230 may be configured to transmit or receive signals in a wireless or wired manner. The transceiver 230 may also perform operations such as low noise amplifying, impedance matching, frequency mixing, up or down frequency conversion, filtering, amplifying, and so forth. The transceiver 230 may include one or more analog-to-digital (A/D) or digital-to-analog (D/A) converters which are configured to convert an analog signal format to digital signal format or convert a digital signal format to an analog signal format. The controller 200 may communicatively connect to the HMD 100, image capture device 310, or image capture device 320 through the transceiver 230.

The HMD 100 may support XR technology and may provide or display an XR scene for a user worn the HMD 100, wherein the XR technology may include augmented reality (AR) technology, virtual reality (VR) technology, and mixed reality (MR) technology. The HMD 100 may include a processor 110, a storage medium 120, a transceiver 130, a display 140, and a camera 150. In one embodiment, the HMD 100 may further include an accelerometer (or an IMU) 160 or a magnetometer 170.

The processor 110 is, for example, a GPU, an ISP, an IPU, a CPU, another programmable general purpose or special purpose MCU, a microprocessor, a DSP, a programmable controller, a special ASIC, an ALU, a CPLD, a FPGA or other similar components or a combination of the foregoing components. The processor 110 may be coupled to the storage medium 120, the transceiver 130, the display 140, the camera 150, the accelerometer 160, and the magnetometer 170, and may access and execute a plurality of modules and various application programs stored in the storage medium 120.

The storage medium 120 is, for example, any type of fixed or removable RAM, a ROM, a flash memory, a HDD, a SSD, or similar components or a combination of the foregoing components, and is configured to store the plurality of modules or the various application programs that can be executed by the processor 110.

The transceiver 130 may be configured to transmit or receive signals in a wireless or wired manner. The transceiver 130 may also perform operations such as low noise amplifying, impedance matching, frequency mixing, up or down frequency conversion, filtering, amplifying, and so forth. The transceiver 130 may include one or more A/D or D/A converters which are configured to convert an analog signal format to digital signal format or convert a digital signal format to an analog signal format. The HMD 100 may communicatively connect to the controller 200 through the transceiver 130.

The display 140 may be used for displaying video data or image data such as an XR scene of the XR environment. The display 140 may include a liquid-crystal display (LCD) display or an organic light-emitting diode (OLED) display. In one embodiment, the display 140 may provide an image beam to the eye of the user to form the image on the retina of the user such that the user may see an XR scene created by the HMD 100.

The camera 150 may be a photographic device for capturing images. The camera 150 may include an image sensor such as a complementary metal oxide semiconductor (CMOS) or a charge coupled device (CCD) sensor.

The image capture device 310 may be a camera. The image capture device 310 may include a processor 311 and a transceiver 314. In one embodiment, the image capture device 310 may further include an accelerometer (or an IMU) 312 or a magnetometer 313. The processor 311 is, for example, a GPU, an ISP, an IPU, a CPU, another programmable general purpose or special purpose MCU, a microprocessor, a DSP, a programmable controller, a special ASIC, an ALU, a CPLD, a FPGA or other similar components or a combination of the foregoing components. The processor 311 may be coupled to the accelerometer 312, the magnetometer 313, and the transceiver 314.

The transceiver 314 may be configured to transmit or receive signals in a wireless or wired manner. The transceiver 314 may also perform operations such as low noise amplifying, impedance matching, frequency mixing, up or down frequency conversion, filtering, amplifying, and so forth. The transceiver 314 may include one or more A/D or D/A converters which are configured to convert an analog signal format to digital signal format or convert a digital signal format to an analog signal format. The image capture device 310 may communicatively connect to the controller 200 through the transceiver 314.

The function or the structure of the image capture device 320 may be similar as the image capture device 310. More specifically, the function or structure of the processor 321, accelerometer 322, the magnetometer 323, and the transceiver 324 are similar as the processor 311, accelerometer 312, the magnetometer 313, and the transceiver 314 respectively.

The HMD 100 may provide an XR scene to the user based on a first coordinate system, wherein the first coordinate system may be a three-dimensional coordinate system (e.g., Cartesian coordinate system). Accordingly, the data (e.g., coordinates of a point) transmitted between the HMD 100 and the controller 200 may be corresponded to the first coordinate system. The first coordinate may be updated with a movement of the HMD 100. For example, the HMD 100 may set a location of the HMD 100 as an origin of the first coordinate system according to the image captured by the camera 150. After the HMD 100 moves, the location of the HMD 100 will be changed, and the origin of the first coordinate system will be reset. Accordingly, the first coordinate system may be updated according to the reset origin of the first coordinate system. The controller 200 may obtain information of the first coordinate system from the HMD 100 periodically. In one embodiment, the controller 200 may output the information of the first coordinate system to an external device for further use. For example, the controller 200 may output the coordinate of the first coordinate system to an external image processing device, wherein the external image processing device may create three-dimensional (3D) computer graphic or animation according to the coordinate.

Figure 2:
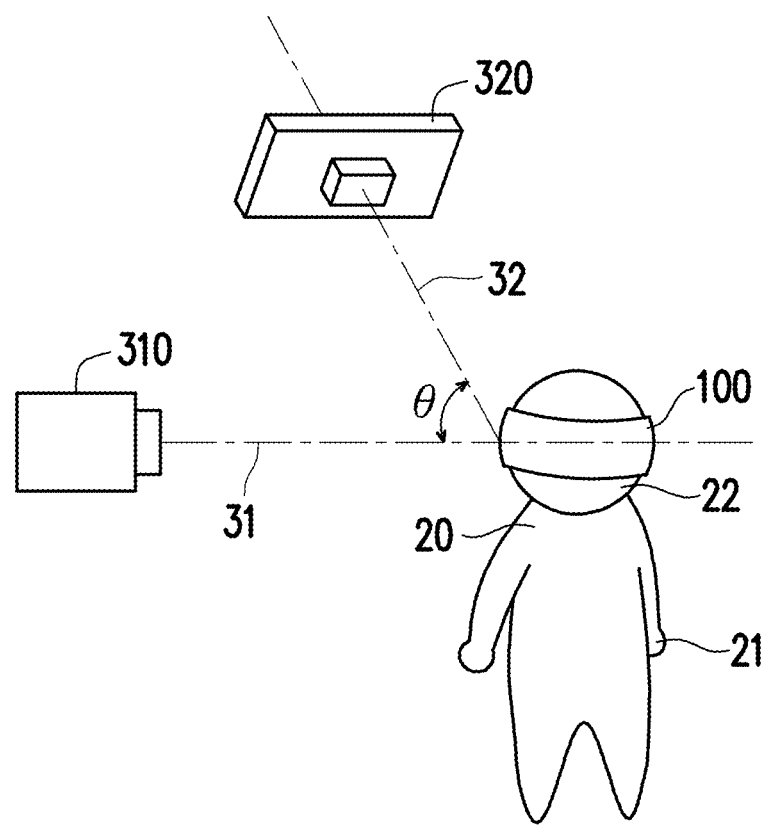
FIG. 2 illustrates a schematic diagram of the image capture devices and the user worn the HMD according to one embodiment of the present invention.

FIG. 2 illustrates a schematic diagram of the image capture devices 310 and 320 and the user 20 worn the HMD 100 according to one embodiment of the present invention. The image capture device 310 (or 320) may obtain an image including an object 21 and an object 22. The object 21 may be, for example, a handheld device (e.g., a wristband) or a body part (e.g., a hand) of the user 20 worn the HMD 100. The object 22 may be, for example, the HMD 100 or the head of the user 20. The image capture device 310 may be configured with a second coordinate system, wherein the second coordinate system may be a three-dimensional coordinate system (e.g., Cartesian coordinate system). Accordingly, the data (e.g., coordinates of a point) transmitted between the image capture device 310 and the controller 200 may be corresponded to the second coordinate system. The second coordinate system is fixed to the controller 200 or the image capture device 310. That is, the second coordinate system configured for the image capture device 310 and the controller 200 will not change. In one embodiment, the controller 200 may output the information of the second coordinate system to an external device for further use. For example, the controller 200 may output the coordinate of the second coordinate system to an external image processing device, wherein the external image processing device may create 3D computer graphic or animation according to the coordinate.

The controller 200 may align the first coordinate system of the current time point with the second coordinate system to obtain a transformation matrix of the current time point. The coordinates of the first coordinate system may be mapped to the coordinates of the second coordinate system according to the transformation matrix. The transformation matrix may change with times. For example, the controller 200 may obtain first coordinate systems corresponding to difference time points respectively from the HMD 100, such as a first coordinate system corresponding to a first time point and a first coordinate system corresponding to a second time point different from the first time point. The transformation matrix generated by aligning the first coordinate system corresponding to the first time point with the second coordinate system would be different from the transformation matrix generated by aligning the first coordinate system corresponding to the second time point with the second coordinate system. In one embodiment, the controller 200 may output the transformation matrix to an external device for further use.

In order to align the first coordinate system with the second coordinate system, the controller 200 may check if the scale of the first coordinate system is the same as the scale of the second coordinate system. If the scale of the first coordinate system is different from the scale of the second coordinate system, the controller 200 may normalize the scale of the first coordinate system to the scale of the second coordinate system. For example, if the scale of the first coordinate system is 10 cm per grid and the scale of the second coordinate system is 20 cm per gird, the controller 200 may normalize the scale of the first coordinate system from 10 cm per gird to 20 cm per grid. On the other hand, the controller 200 may check if the first coordinate system and the second coordinate system obey the same hand rule. If the second coordinate system is a left-handed coordinate system and the first coordinate system is a right-handed system, the controller 200 may transform the first coordinate system form the right-handed system to the left-handed coordinate system. If the second coordinate system is a right-handed coordinate system and the first coordinate system is a left-handed coordinate system, the controller 200 may transform the first coordinate system from the left-handed coordinate system to the right-handed coordinate system.

To align the first coordinate system with the second coordinate system, the controller 200 may align an orientation of the first coordinate system with an orientation of the second coordinate system. If at least two axes of the first coordinate system and the second coordinate system are parallel, the controller 200 may determine that the orientation of the first coordinate system is aligned with the orientation of the second coordinate system. After the orientations of the first coordinate system and the second coordinate system are aligned, the controller 200 may set an origin of the first coordinate system and an origin of the second coordinate system to a common reference point of the image captured by the image capture device 310 and the XR scene provided by the HMD 100. The common reference point may a point shown in both the image captured by the image capture device 310 and the XR scene provided by the HMD 100, wherein a point shown in the XR scene provided by the HMD 100 may be a point captured by the camera 150 of the HMD 100. On the other hand, the common reference point may be a point known to the controller 200 (e.g., a point once captured by the camera 150 and the image capture device 310). In one embodiment, the controller 200 may detect a location of the HMD 100 (e.g., according to the image captured by the image capture device 310), and may determine the common reference point according to the location of the HMD 100. After the origins of the first coordinate system and the second coordinate system are set, the controller 200 may determine that the first coordinate system is aligned with the second coordinate system.

Assuming that the first coordinate system and the second coordinate system are Cartesian coordinate systems, each of the first coordinate system and the second coordinate system may have an x-axis, a y-axis, and a z-axis. In one embodiment, the y-axis of the first coordinate system may be aligned with the y-axis of the second coordinate system by using the accelerometer 160 and the accelerometer 312, wherein the y-axis of the first coordinate system may be an axis parallel with a direction from the bottom of the HMD 100 to the top of the HMD 100, and the y-axis of the second coordinate system may be an axis parallel with a direction from the bottom of the image capture device 310 to the top of the image capture device 310. Specifically, the controller 200 may receive, from the HMD 100, a gravity direction measured by the accelerometer 160, and may set the y-axis of the first coordinate system according to the gravity direction measured by the accelerometer 160. On the other hand, the controller 200 may receive, from the image capture device 310, a gravity direction measured by the accelerometer 312, and may set the y-axis of the second coordinate system according to the gravity direction measured by the accelerometer 312. Since the gravity direction measured by the accelerometer 160 may be the same as or similar to the gravity direction measured by the accelerometer 312, the y-axis of the first coordinate system may be aligned with the y-axis of the second coordinate system.

In one embodiment, the controller 200 may algin the z-axis of the first coordinate system with the z-axis of the second coordinate system by using the magnetometer 170 and the magnetometer 313, wherein the z-axis of the first coordinate system may be an axis parallel to an optical axis of the camera 150 (or parallel to a direction the user 20 worn the HMD 100 is facing), and the z-axis of the second coordinate system may be an axis parallel to an optical axis of the image capture device 310. Specifically, the controller 200 may receive, from the HMD 100, a geomagnetic direction measured by the magnetometer 170, and may set the z-axis of the first coordinate system according to the geomagnetic direction measured by the magnetometer 170. On the other hand, the controller 200 may receive, from the image capture device 310, a geomagnetic direction measured by the magnetometer 313, and may set the z-axis of the second coordinate system according to the geomagnetic direction measured by the magnetometer 313. Since the geomagnetic direction measured by the magnetometer 170 may be the same as or similar to the geomagnetic direction measured by the magnetometer 313, the z-axis of the first coordinate system may be aligned with the z-axis of the second coordinate system.

In one embodiment, the controller 200 may receive an image captured by the image capture device 310 and may determine an optical axis of the image capture device 310 according to the image. After the optical axis of the image capture device 310 being determined, the controller 200 may set the z-axis of the first coordinate system according to the optical axis of the image capture device 310, and may set the z-axis of the second coordinate system according to the optical axis of the image capture device 310. For example, the controller 200 may set the z-axis of the first coordinate system to be parallel with the optical axis of the image capture device 310, and may set the z-axis of the second coordinate system to be parallel with the optical axis of the image capture device 320.

After the first coordinate system and the second coordinate system being aligned and the transformation matrix between the first coordinate system and the second coordinate system being generated, the controller 200 may determine a vector between the object 21 and the object 22 according to the image captured by the image capture device 310. In one embodiment, the controller 200 may determine the vector between the object 21 and the object 22 according to a plurality of images captured by a plurality of image capture devices such as the image capture device 310 and the image capture device 320. The vector determined by a plurality of images may be more accurate than the vector determined by a single image since the plurality of images may provide depth information of the object 21 and the object 22 to the controller 200. In order to maximize the depth information obtained from the images captured by the image capture devices 310 and 320, the image capture devices 310 and 320 may be disposed in particular positions, such that the angle θ between the optical axis 31 of the image capture device 310 and the optical axis 32 of the image capture device 320 can be optimized. In one embodiment, the optical axis 31 may be perpendicular to the optical axis 32 (i.e., the angle θ may be 90 degree). In one embodiment, the controller 200 may output the vector between the object 21 and the object 22 to an external device for further use.

In one embodiment, the controller 200 may determine the vector between the object 21 and the object 22 by inputting the image captured by the image capture device 310 and/or the image captured by the image capture device 320 to the ML model 221, wherein the ML model 221 may be an object detection model.

Figure 3:
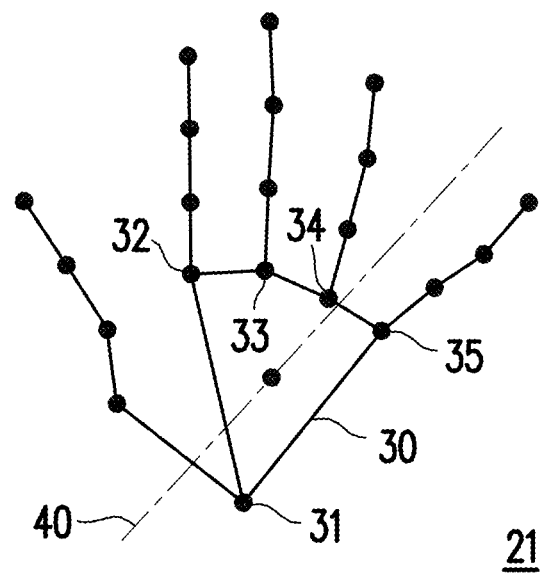
FIG. 3 illustrates a schematic diagram of the tracking points of the object according to one embodiment of the present invention.

The controller 200 may determine the orientation of the object 21 by using the ML model 221. FIG. 3 illustrates a schematic diagram of the tracking points of the object 21 according to one embodiment of the present invention, wherein the object 21 may be, for example, a hand of the user 20. The controller 200 may input the image captured by the image capture device 310 (and/or the image captured by the image capture device 320) to obtain a plurality of tracking points of the object 21, including tracking points 31, 32, 33, 34, and 35. The controller 200 may determine the orientation of the object 21 according to the plurality of tracking points. Specifically, the controller 200 may determine a plane 30 formed by the tracking points 31, 32, 33, 34, and 35, and the controller 200 may further determine a normal vector 40 of the plane 30. The controller 200 may determine the orientation of the object 21 according to the normal vector 40 of the plane 30.

After obtaining a vector between the object 21 and the object 22 by the ML model 221, the controller 200 may transform the vector according to the transformation matrix to generate a new vector corresponding to the aligned first coordinate system. The controller 200 may transmit the new vector and/or the orientation of the object 21 to the HMD 100. The HMD 100 may update a virtual object in the XR scene according to the new vector and/or the orientation of the object 21, wherein the virtual object corresponds to the object 21. For example, assume that the object 21 is a hand of the user 20 and the object 22 is a head of the user 20, the virtual object may be a virtual hand shown in the XR scene provided by the HMD 100. When the hand moves, the controller 200 may obtain the vector between the hand of the user 20 and the head of the user 20 and the orientation of the hand, transform the vector to a new vector corresponding to the aligned first coordinate system, and transmit the new vector and the orientation of the hand to the HMD 100. The HMD 100 may update the virtual hand in the XR scene according to the new vector and the orientation of the hand received from the controller 200. In one embodiment, the controller 200 may output the new vector to an external device for further use.

Figure 4:
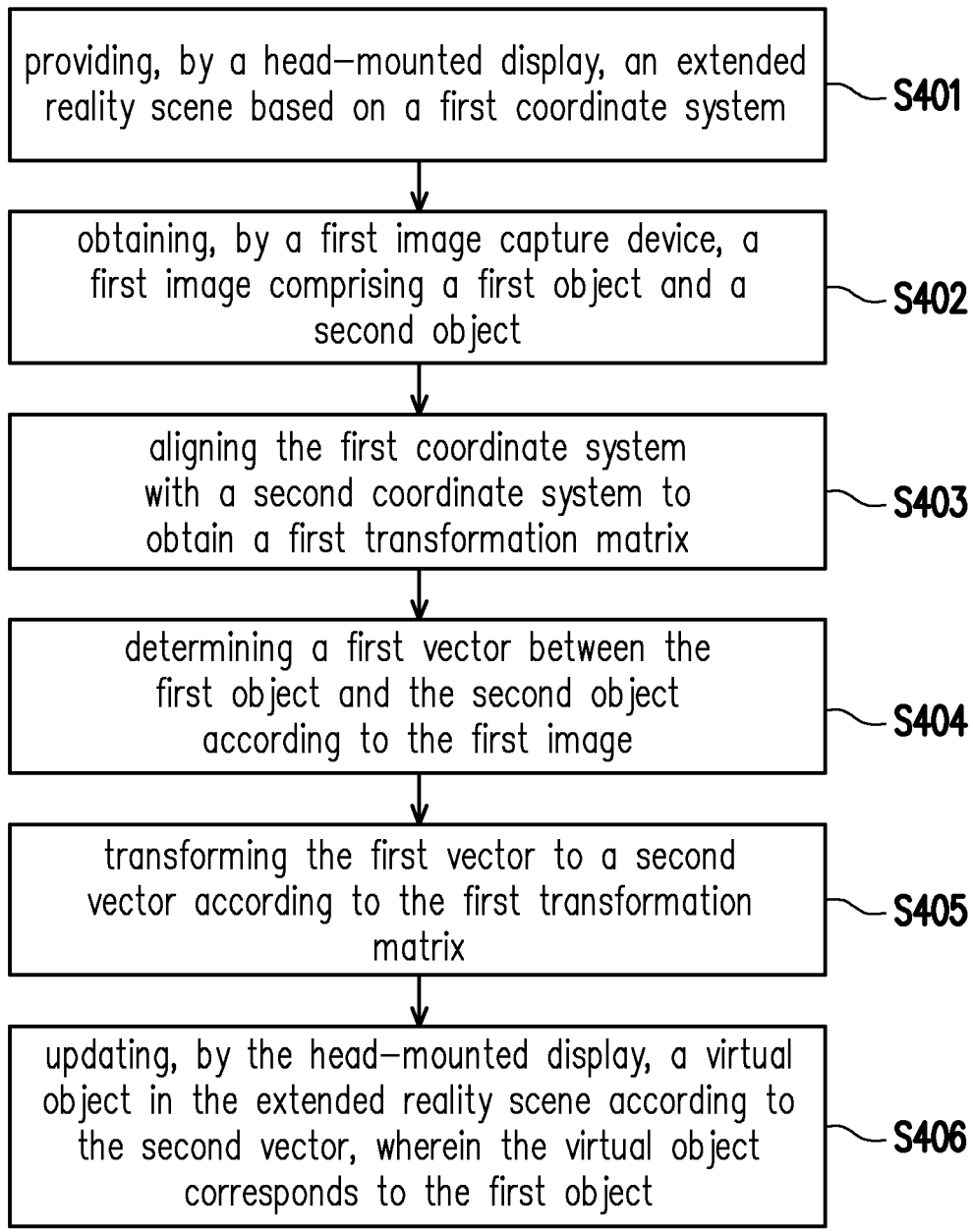
FIG. 4 illustrates a flowchart of a method of object tracking for an XR environment according to one embodiment of the present invention.

FIG. 4 illustrates a flowchart of a method of object tracking for an XR environment according to one embodiment of the present invention, wherein the method may be implemented by the system 10 as shown in FIG. 1.

In step S401, providing, by a head-mounted display, an extended reality scene based on a first coordinate system. In step S402, obtaining, by a first image capture device, a first image comprising a first object and a second object. In step S403, aligning the first coordinate system with a second coordinate system to obtain a first transformation matrix. In step S404, determining a first vector between the first object and the second object according to the first image. In step S405, transforming the first vector to a second vector according to the first transformation matrix. In step S406, updating, by the head-mounted display, a virtual object in the extended reality scene according to the second vector, wherein the virtual object corresponds to the first object.

In view of the above, in the invention, the controller may capture an image of a user worn the HMD by an image capture device, and may align the coordinate systems respectively corresponding to the HMD and the image capture device. The controller may obtain a vector between two objects (e.g., the HMD and the user's hand) and transmit the vector to the HMD. Accordingly, the HMD may update a virtual object the provided XR scene according to the vector. Since the data size of the vector is small, the data traffic between the HMD and the controller can be reduced. The controller may align the two coordinate systems by using such as accelerometers, magnetometers, or optical axis of the image capture device. The present invention provides a low cost and convenient way to perform motion capture for the user of the XR system.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system of object tracking for an extended reality environment, comprising:
   a head-mounted display, providing an extended reality scene based on a first coordinate system;
   a first image capture device, obtaining a first image comprising a first object and a second object;
   a second image capture device, obtaining a second image comprising the first object and the second object; and
   a controller, communicatively connected to the head-mounted display and the first image capture device, wherein the controller is configured to:
   align the first coordinate system with a second coordinate system to obtain a first transformation matrix;
   determine a first vector between the first object and the second object according to the first image and the second image by inputting the first image and the second image to a machine learning model;
   obtain a plurality of tracking points of the first object by the machine learning model;
   determine an orientation of the first object according to the plurality of tracking points; and
   transform the first vector to a second vector according to the first transformation matrix and transmit the second vector to the head-mounted display,
   wherein the head-mounted display updates a virtual object in the extended reality scene according to the second vector and the orientation of the first object, wherein the virtual object corresponds to the first object.

2. The system as claimed in claim 1, wherein the controller is further configured to:
   align an orientation of the first coordinate system with an orientation of the second coordinate system; and
   set an origin of the first coordinate system and an origin of the second coordinate system to a common reference point of the first image and the extended reality scene.

3. The system as claimed in claim 2, wherein the head-mounted display comprises a first accelerometer and the first image capture device comprises a second accelerometer, wherein the controller is further configured to:
- set a y-axis of the first coordinate system according to a first gravity direction measured by the first accelerometer; and
- set a y-axis of the second coordinate system according to a second gravity direction measured by the second accelerometer.

4. The system as claimed in claim 2, wherein the head-mounted display comprises a first magnetometer and the first image capture device comprises a second magnetometer, wherein the controller is further configured to:
- set a z-axis of the first coordinate system according to a first geomagnetic direction measured by the first magnetometer; and
- set a z-axis of the second coordinate system according to a second geomagnetic direction measured by the second magnetometer.

5. The system as claimed in claim 2, wherein the controller is further configured to:
- determine an optical axis of the first image capture device according to the first image;
- set a z-axis of the first coordinate system according to the optical axis; and
- set a z-axis of the second coordinate system according to the optical axis.

6. The system as claimed in claim 2, wherein the controller is further configured to:
- detect a location of the head-mounted display from the first image; and
- determine the common reference point according to the location of the head-mounted display.

7. The system as claimed in claim 2, wherein the controller is further configured to:
- normalize a scale of the first coordinate system to a scale of the second coordinate system; and
- transform the first coordinate system from a left-handed coordinate system to a right-handed coordinate system in response to the second coordinate system being the right-handed coordinate system.

8. The system as claimed in claim 1, wherein the first coordinate system is updated with a movement of the head-mounted display, wherein the controller is further configured to:
- obtain the first coordinate system corresponding to a first time point from the head-mounted display; and
- align the first coordinate system corresponding to the first time point with the second coordinate system to obtain the first transformation matrix.

9. The system as claimed in claim 8, wherein the head-mounted display is further configured to:
- align the first coordinate system corresponding to a second time point with the first coordinate system corresponding to the first time point to obtain a second transformation matrix, wherein the second time point is different from the first time point;
- transform the second vector to a third vector according to the second transformation matrix; and
- update the virtual object according to the third vector.

10. The system as claimed in claim 1, wherein an optical axis of the first image capture device is perpendicular to an optical axis of the second image capture device.

11. The system as claimed in claim 1, wherein the first object comprises a body part of a user wearing the head-mounted display, and the second object comprises the head-mounted display.

12. The system as claimed in claim 1, wherein the controller is further configured to:
- output the second vector.

13. A method of object tracking for an extended reality environment, comprising:
- providing, by a head-mounted display, an extended reality scene based on a first coordinate system;
- obtaining, by a first image capture device, a first image comprising a first object and a second object;
- obtaining, by a second image capture device, a second image comprising the first object and the second object;
- aligning the first coordinate system with a second coordinate system to obtain a first transformation matrix;
- determining a first vector between the first object and the second object according to the first image and the second image by inputting the first image and the second image to a machine learning model;
- obtaining a plurality of tracking points of the first object by the machine learning model;
- determining an orientation of the first object according to the plurality of tracking points;
- transforming the first vector to a second vector according to the first transformation matrix; and
- updating, by the head-mounted display, a virtual object in the extended reality scene according to the second vector and the orientation of the first object, wherein the virtual object corresponds to the first object.

* * * * *